(12) United States Patent
Davis

(10) Patent No.: US 8,413,960 B2
(45) Date of Patent: Apr. 9, 2013

(54) INFLATABLE EQUIPMENT STABILIZER

(76) Inventor: Brent E. Davis, Amarillo, TX (US)

( * ) Notice: Subject to any disclaimer, the term of this patent is extended or adjusted under 35 U.S.C. 154(b) by 344 days.

(21) Appl. No.: 12/821,283

(22) Filed: Jun. 23, 2010

(65) Prior Publication Data

US 2010/0326268 A1 Dec. 30, 2010

Related U.S. Application Data

(60) Provisional application No. 61/220,251, filed on Jun. 25, 2009.

(51) Int. Cl.
*B66F 3/35* (2006.01)
*B66F 3/24* (2006.01)

(52) U.S. Cl.
USPC ..................... 254/93 HP; 254/93 R

(58) Field of Classification Search .................. 52/2.26; 254/89 H, 93 H, 93 HP, 93 R; *B66F 3/35*
See application file for complete search history.

(56) References Cited

U.S. PATENT DOCUMENTS

| | | | | |
|---|---|---|---|---|
| 2,140,325 A | * | 12/1938 | Morse | 60/328 |
| 2,644,449 A | * | 7/1953 | Champagne | 128/118.1 |
| 2,714,011 A | * | 7/1955 | Albee | 280/1 |
| 3,416,762 A | * | 12/1968 | Headrick | 410/85 |
| 3,990,681 A | * | 11/1976 | McKeen, Sr. | 254/88 |
| 4,036,472 A | * | 7/1977 | Orndorff, Jr. | 254/93 HP |
| 4,275,869 A | * | 6/1981 | Clements | 254/89 H |
| 4,372,533 A | * | 2/1983 | Knaus et al. | 254/93 HP |
| 4,417,639 A | * | 11/1983 | Wegener | 180/125 |
| 4,470,578 A | * | 9/1984 | Arvidsson et al. | 254/2 C |
| 4,560,145 A | * | 12/1985 | Widmer | 254/93 HP |
| 4,567,855 A | * | 2/1986 | Snell et al. | 119/722 |
| 4,655,008 A | * | 4/1987 | Parish | 52/2.22 |
| 4,723,751 A | * | 2/1988 | Hale | 249/13 |
| 4,865,096 A | * | 9/1989 | Schober et al. | 383/107 |
| 5,120,184 A | * | 6/1992 | Gerawan | 414/495 |
| 5,506,012 A | * | 4/1996 | Wright et al. | 428/35.2 |
| 5,529,293 A | * | 6/1996 | Haugs | 267/118 |
| 5,669,086 A | * | 9/1997 | Garman | 5/86.1 |
| 6,070,366 A | * | 6/2000 | Pierson | 52/2.17 |
| 6,148,461 A | * | 11/2000 | Cook et al. | 5/713 |
| 6,497,389 B1 | * | 12/2002 | Rawdon et al. | 244/138 R |
| 6,513,418 B1 | * | 2/2003 | Simmons et al. | 92/92 |
| 6,565,405 B2 | * | 5/2003 | Hsu et al. | 446/89 |
| 6,648,507 B2 | * | 11/2003 | Joshi et al. | 383/95 |
| 7,300,104 B1 | * | 11/2007 | Hagedorn | 297/158.3 |
| 2005/0132490 A1 | * | 6/2005 | Davis | 5/81.1 R |
| 2007/0000182 A1 | * | 1/2007 | Boujon | 52/2.17 |
| 2008/0001130 A1 | * | 1/2008 | Dibdin | 254/93 HP |
| 2008/0191180 A1 | * | 8/2008 | Gaunt | 254/11 |

FOREIGN PATENT DOCUMENTS

EP 197381 A1 * 10/1986

* cited by examiner

*Primary Examiner* — Brian Glessner
*Assistant Examiner* — Joseph J Sadlon
(74) *Attorney, Agent, or Firm* — Susanne M Moore

(57) ABSTRACT

A method and apparatus for stabilizing a piece of equipment, especially a wind turbine blade when removed from a wind turbine tower, the method and apparatus including a stabilizer bag placed on the ground, having one or more interior inflatable cavities surrounded by a durable exterior membrane having welded seams and at least one valve for purposes of inflation and deflation.

8 Claims, 4 Drawing Sheets

INFLATABLE EQUIPMENT STABILIZER

CROSS REFERENCE TO RELATED APPLICATIONS

This application claims the benefit of provisional patent application 61/220,251 filed Jun. 25, 2009 by the present inventor and the application is hereto incorporated by reference in its entirety.

STATEMENT REGARDING FEDERALLY SPONSORED RESEARCH OR DEVELOPMENT

Not Applicable

NAMES OF PARTIES TO JOINT RESEARCH AGREEMENT

Not Applicable

REFERENCE TO SEQUENCE LISTING

Not Applicable

DESCRIPTION OF ATTACHED APPENDIX

Not Applicable

BACKGROUND OF THE INVENTION

1. Field of the Invention

The disclosed invention relates to a method and system for stabilization and support of equipment, specifically wind turbine blades when they are removed from a wind turbine for cleaning or maintenance tasks.

2. Description of Related Art

Wind turbines are rapidly gaining respect as a viable source of energy needs and consequently, the production and installation of these structures is exploding. Accompanying their growth is a host of challenges including the need to develop better and easier ways to perform cleaning and maintenance tasks.

The traditional wind turbine is a three bladed turbine mounted on a tower. Horizontal-axis wind turbines (HAWT) are common and typically comprise a main rotor shaft and electrical generator at the top of a tower. Larger turbines generally use a wind sensor coupled with a servo motor and often a gearbox to speed the blade rotation to a suitable speed for an electrical generator.

On commercial wind turbines, towers are tall, at times nearly 90 meters. Turbine blades are extremely large and stiff to prevent the blades from being pushed into the tower by high winds. Cleaning and maintenance to the blades, hub, axles, bearings, and or the generator, motor or gearbox is critical to ensure efficient performance. The most common method of accessing the blades for these routine tasks is to remove the entire bladed turbine from the tower. Due to the height of the tower, coupled with the cumbersome size and rigidity of the turbine and blades, removal and maintenance becomes a challenging feat, requiring tall and expensive cranes and skilled operators. Once the turbine and blades are removed from the tower they are typically lowered to the ground for the cleaning or maintenance tasks. The turbine sits on the ground, however the design of the overall structure results in the blades being suspended in the air rather than touching the ground. In this position the blades, with their extreme length unsupported, are extremely vulnerable to catching and twisting in the wind, torquing, bending or breaking.

Workers, in a desperate attempt to support and stabilize the blades during cleaning or maintenance tasks, are resorting to hay bales or huge foam blocks on which to set the blades. These methods come with significant inherent disadvantages. Hay is an impractical solution because often the wind turbines are located on ranches and farms where range animals are present. Cows, horses, goats, sheep and other animals then mill about the blades in an attempt to eat the hay or, in some cases, even the foam blocks. This situation creates a nuisance and a danger to the contractors. The hay bales are large and difficult to move. The hay itself is rough and scratchy and can damage the blades. Foam blocks weigh less than hay but they are still bulky and must be transported on large trailers from site to site, resulting in unnecessary equipment and fuel expense, certainly contradicting the purpose of creating wind energy.

There is a need for quick and easy system to support and stabilize wind turbine blades during maintenance efforts. The solution must be relatively inexpensive, lightweight and small for purposes of packaging and transport, but yet capable of supporting and stabilizing great weight and large bulk.

Notation and Nomenclature

Certain terms are used throughout the following description to refer to particular method components. As one skilled in the art will appreciate, design and manufacturing companies may refer to a component by different names. This document does not intend to distinguish between components that differ in name but not function.

In the following discussion, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other intermediate devices and connections. Moreover, the term "method" means "one or more components" combined together. Thus, a method can comprise an "entire method" or "sub methods" within the method.

SUMMARY OF THE INVENTION

The disadvantages shown in the prior art are solved by a method and system for stabilizing equipment. The disclosed method and apparatus is an inflatable stabilization system that quickly, easily, and inexpensively stabilizes wind turbine blades during routine cleaning and maintenance tasks. The system is deflatable for high efficiency packing and transport. It is an objective of the disclosed invention to overcome the disadvantages in the current methods used for supporting and stabilizing equipment, and especially wind turbine blades.

It is an objective of the disclosed invention to provide a stabilizer and support for a wind turbine blade when the turbine and blades are removed from the tower.

It is an objective of the disclosed invention to provide an equipment stabilizer and support method and apparatus that has high packaging and travel efficiency.

It is an objective of the disclosed invention to provide an equipment stabilizer and support method and apparatus that is easy and fast to set up and that is relatively inexpensive.

It is an objective of the disclosed invention to provide an equipment stabilizer and support method and apparatus that does not damage the wind turbine blades.

It is an objective of the disclosed invention to provide an equipment stabilizer and support method and apparatus that neither harms nor attracts animals.

It is an objective of the disclosed invention to provide an equipment stabilizer and support method and apparatus that can withstand harsh weather extremes such as sun and high winds.

It is further an objective of the disclosed invention to provide an equipment stabilizer and support method and apparatus that is durable enough to last from jobsite to jobsite and to withstand terrain.

BRIEF DESCRIPTION OF THE DRAWINGS

The application makes no claim for the structure of certain objects depicted in the photos and drawings, such as drawings of windmill turbines, and they are considered prior art.

The drawings contained herein represent preferred embodiments of the invention and are not intended to limit the scope. For a detailed description of various embodiments, reference will now be made to the accompanying illustrative drawings in which.

DETAILED DESCRIPTION OF THE PREFERRED EMBODIMENTS

The terrain where wind turbines are most popular are rural, arid, windy regions that can be harsh. The terrain and circumstances require a stabilizer system that is specifically designed to be heavy duty and can withstand the rough ground and weather elements.

Disclosed is an invention for stabilizing a piece of equipment using a specially constructed inflatable stabilizer bag system. The system comprises, in combination, a plurality of inflatable and deflatable stabilizer bags, a ground cover, an anchoring kit, and a means for inflating the stabilizer bags.

Figure 1:
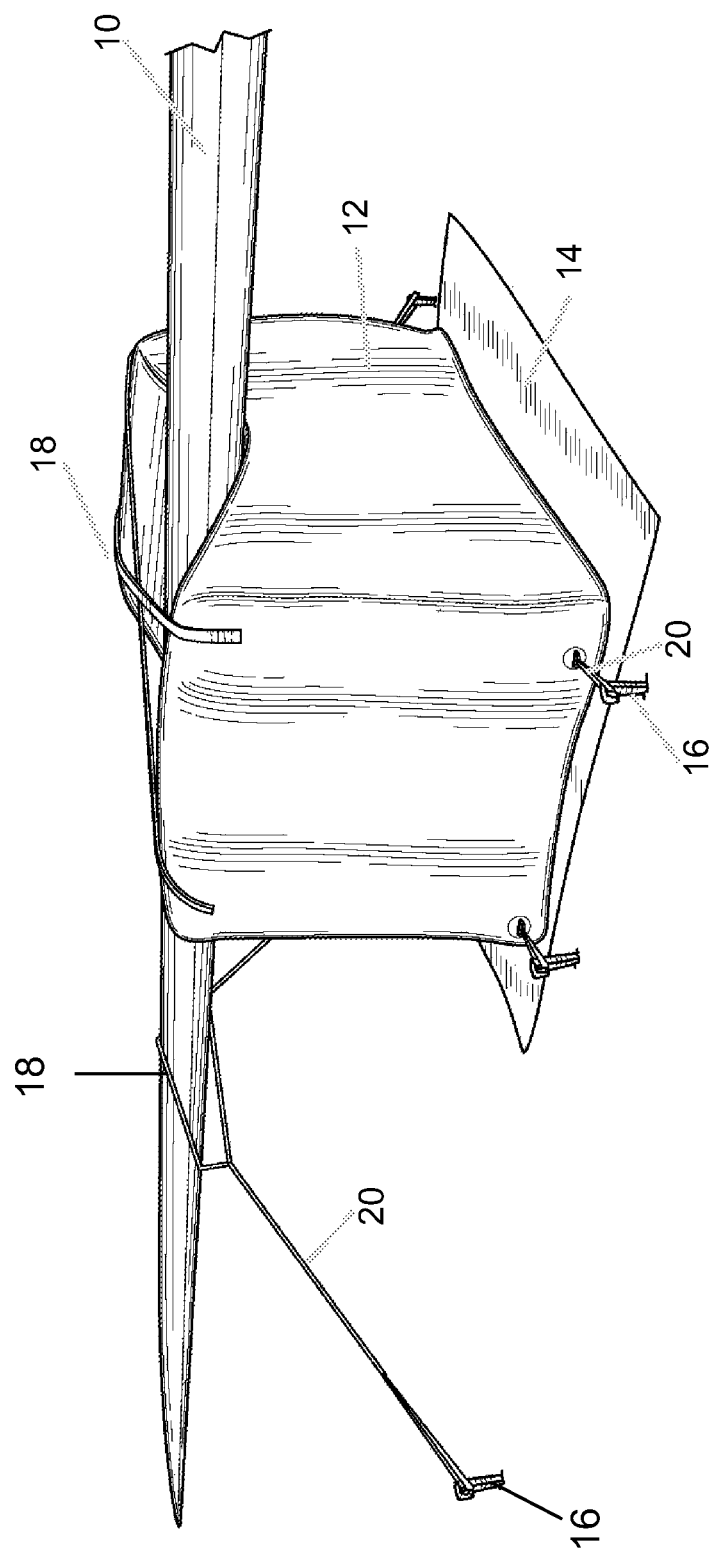
FIG. 1 depicts a view a preferred embodiment of the disclosed invention.

FIG. 1 depicts a close up view of the disclosed invention in place under a wind turbine blade 10. The depicted embodiment shows a stabilizer bag 12 in its inflated state, resting atop a protective ground tarp 14. In the preferred embodiment, ground tarps are a part of the system as they protect the bottom of the stabilizer bag from rough or rocky ground. The ground tarps may be further defined as heavy duty vinyl coated polyester and are of a width and length at least a few inches larger in dimension than that of the base of the bag itself.

The stabilizer bag 12 is made of heavy duty materials which, in a preferred embodiment, are vinyl coated polyester 22 ounce and UV resistant. The preferred dimensions for adequate stabilization of the wind turbine blades are 10'L by 5'W by 6.5'H, although other dimensions may certainly be used depending on the size of the blade being stabilized.

The stabilizer bag 12 is secured to the ground by anchor stakes 16. The tarp 14 may be staked down as well as the bag 12 if desired.

If necessary, and specifically in high wind areas, the blade 10 itself may be strapped or tied down to the bag 12 using straps 18 adhered to the bag 12, although this is not an essential step under most conditions as the weight of the blade 10 typically holds the blade 10 in place on the bag 12. The blade 10 may be secured to the ground by a strap 18 around the free end of the blade 10 and anchored with an anchor stake 16 securely placed in the ground. The bag 12 can also be secured to the ground using tie downs 20 with anchor stakes 16 securely placed in the ground. It is helpful to secure the bag 12 to the ground prior to placing the wind turbine blade 10 on it or after removing the wind turbine blade 10 for purposes of holding the bag 12 in place, especially in high wind conditions.

In a preferred embodiment, the stabilizer bag 12 is deflated for packing and transportation and inflated on the jobsite prior to use.

Figure 2:
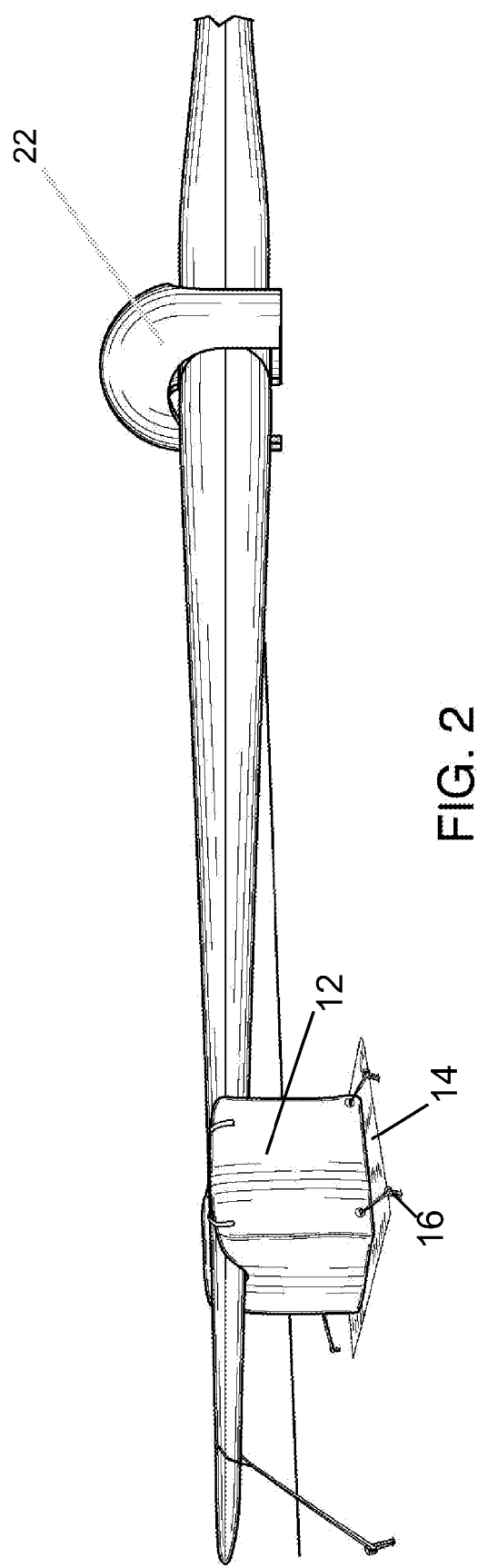
FIG. 2 depicts a preferred embodiment of the disclosed invention.

FIG. 2 reflects the preferred embodiment of the disclosed invention with a more perspective view. The wind turbine 22 sits on the ground and the blade 10 sits securely on the stabilizer bag 12 once it is in its inflated state. The blade 10 rests on the bag 12 at a point where the weight is best supported which, in a preferred embodiment for a wind turbine blade, may be a point somewhere between the midpoint of the blade 10 and the far end of the blade 10. The ground tarp 14 and anchor stakes 16 are noted in the view. The stabilizer bag 12 keeps the blade 10 from twisting, torquing or bending, especially in wind.

Figure 3:
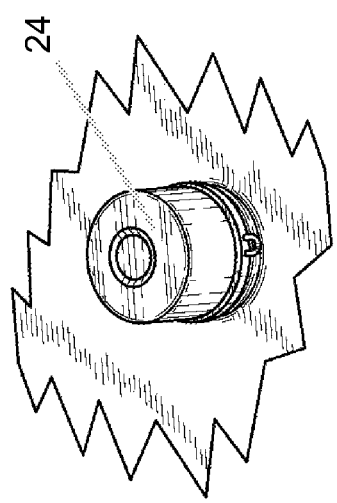
FIG. 3 depicts a preferred embodiment of the disclosed invention.

FIG. 3 depicts an outer view of a two way valve 24 which is the preferred embodiment for the entry and exit point for both the inflation and deflation of air in the bag. The two-way valve 24 extends from the inner cavity of the bag to the external surface of the bag for inflation and deflation of the interior of the bag 12. The two way valve 24 is preferably heavy duty to accommodate the frequent inflation and deflation required as the bags are transported from jobsite to jobsite.

Figure 4:
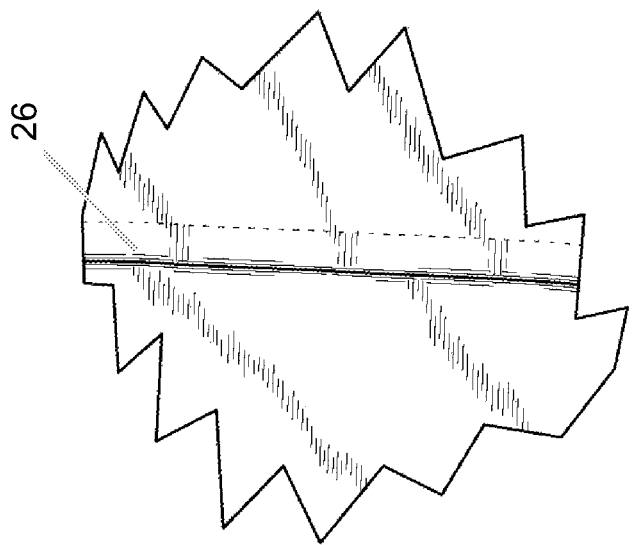
FIG. 4 depicts a preferred embodiment of the disclosed invention.

FIG. 4 depicts the seam 26 of the inflatable bag 12, which, in the preferred embodiment is heavy duty and wide due to the nature of this use requiring significant durability, although it may be of any width to support the intended use. The seams used in the preferred embodiment are 1 ½" wide and are welded, providing a much higher level of durability consistent with the demands of the disclosed use.

Figure 5:
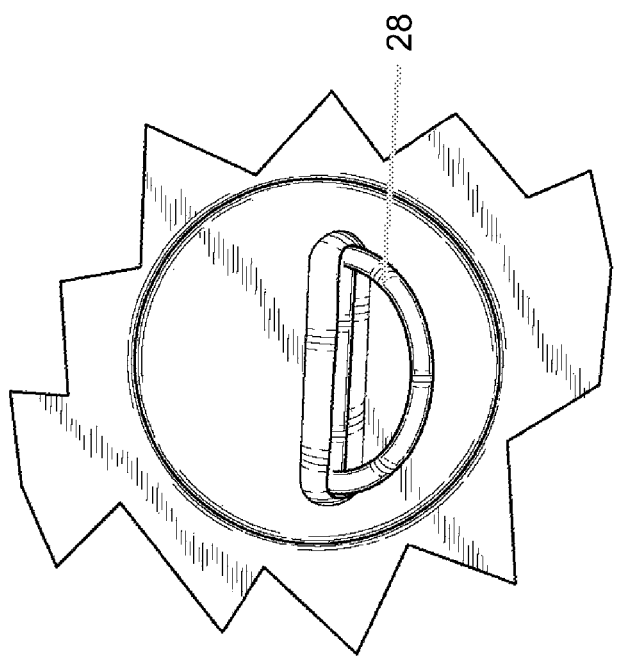
FIG. 5 depicts a preferred embodiment of the disclosed invention.

FIG. 5 reflects the D ring 28 of the air bag 12, which, in the preferred embodiment is welded from behind to provide additional support and durability such that the materials will hold up well when used repetitively and in high wind areas. The concept of welding the D rings from behind on an inflatable air bag is a novel concept conceived by this inventor in order to provide the strength and support to withstand heavy winds and repeated use.

Figure 6:
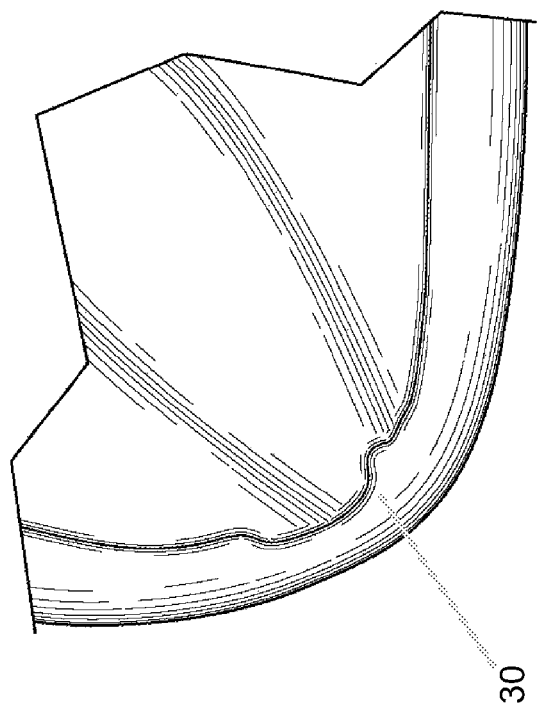
FIG. 6 depicts a preferred embodiment of the disclosed invention.

FIG. 6 reflects the rounded corner 30 design of the inflatable air bag 12 which offers additional durability and minimizes the risk of corner tears and holes.

The method disclosed herein represents a novel method and system to stabilize a piece of equipment 10, specifically a windmill turbine blade 10, during cleaning and maintenance. The stabilizer bag 12 system, represents novel aspects of construction specifically designed to withstand the rigors associated with the bag being repetitively inflated, deflated, transported, bearing significant weight and being utilized in areas of rough terrain and high wind.

In a preferred embodiment, the wind turbine stabilizing system is packaged as a kit comprising three stabilizer bags, twenty four plastic stakes, twenty four bungee cords, three ground tarps, a repair kit consisting of HH-66 glue and vinyl scraps, and a shop vacuum for inflation and deflation of the bags at the jobsite. A 5 hp motor shop vacuum is sufficient power for inflation and deflation of bags of the dimensions described. Once the bags are deflated the entire kit is small, light and easily transportable.

In the preferred embodiment, as a matter of practice, the user would first unpack the kit and inflate all three stabilizer bag by attaching the shop vacuum or other air supply to the two way valve. The user would then place the ground tarp on the ground in the desired location corresponding to where each of the three wind turbine blades would be.

The user then places each inflated stabilizer bag on each ground tarp. In the preferred embodiment, the bags further comprise anchoring points, preferably at each corner, which may further be defined by metal D rings through which anchoring straps can be threaded and staked to the ground. The user may secure each bag to the ground using the supplied plastic stakes and bungee cords.

In the preferred embodiment, the metal D rings are welded from behind for additional strength and stability. The anchoring straps may comprise any sturdy material sufficient to stabilize the bag in high wind situations and may be nylon, rubber, rope or elastic bungee cord construction.

In the preferred embodiment the stakes are of sufficient length and size to adequately hold the bag dimensions in windy conditions. Stakes of 12" in length, and of plastic construction have been found to sufficiently hold the bag in a stable position and are less costly than stakes of heavier material such as iron or other materials. Other sizes may be appropriate, provided they hold the bag securely.

In operation, once the bag is securely in place, the user may lower the wind turbine to the ground, allowing each blade to come to rest on its corresponding stabilizer bag. The user may then proceed to clean and maintain the blades or the turbine.

Upon completion, the user may remove the wind turbine and deflate the stabilizer bags. The bags, anchor stakes, bungee cords and air supply may be packed and compactly stored in an accompanying storage bag.

The disclosed method, system and apparatus solves the problems depicted in the background of the specification and provides a compact, easily transportable, inexpensive and easy to use solution for stabilizing wind turbine blades during cleaning or maintenance tasks. The disclosed invention may be used to support other types of equipment and is not limited to use with wind turbine blades.

While the disclosed method and apparatus has been described in conjunction with the preferred embodiments thereof, many changes, modifications, alterations and variations will be apparent to those skilled in the art. The invention should therefore not be limited to the particular preferred embodiment disclosed but should include all embodiments that could fall within the scope of the claims.

Accordingly, the preferred embodiments of the invention shown in the drawings and described in detail above are intended to be illustrative, not limiting, and various changes may be made without departing from the spirit and scope of the invention as defined by the claims set forth below.

What is claimed is:

1. An apparatus for stabilizing a wind turbine blade when the blade is not attached to a wind turbine tower, the apparatus comprising:
    a stabilizer bag having an inner inflatable cavity surrounded by a vinyl coated polyester UV resistant exterior membrane further having welded seams;
    at least one valve communicating from the inflatable cavity to the outside of the exterior membrane and capable of communicating with an air supply to inflate and deflate the inner cavity;
    at least two rings welded to the bag wherein said welds are within an interior of said bag and said rings extend out of an aperture while said welds remain in said interior;
    at least two anchoring straps for passing through the at least two rings, each having a first end adhered to opposing points on the exterior membrane and having an opposite free end; and
    at least two stakes for holding the anchoring straps, each having a pointed end for driving into the ground and a top end to which the opposite free end of each anchoring strap attach.

2. The apparatus of claim 1 wherein the apparatus further comprises a ground tarp for placement under the stabilizer bag, the ground tarp being heavy duty vinyl coated polyester.

3. The apparatus of claim 1 wherein the at least one valve is a two way valve capable of deflation and also capable of inflation when in communication with an inflation source.

4. The apparatus of claim 1 wherein the apparatus further comprises straps adhered to the bag wherein the straps are passed over the blade for holding it securely to the bag.

5. The at least two rings of claim 1 wherein the rings are D rings.

6. The apparatus of claim 1 wherein the welded seams are at least 1½" wide.

7. A stabilizer bag for stabilizing a piece of equipment, the stabilizer bag comprising:
    an inner inflatable cavity surrounded by a UV resistant exterior membrane having welded seams and further having rounded corners;
    at least one valve communicating from the inside of the inflatable cavity to the outside of the exterior membrane and capable of communicating with an air supply to inflate and deflate the interior cavity;
    at least two D rings welded to the bag wherein said welds are within said interior cavity of said bag and said rings extend out of an aperture while said welds remain in said interior cavity;
    at least two anchoring straps for passing through the at least two D rings, each having a first end adhered to opposing points on the exterior membrane and having an opposite free end;
    at least two stakes for holding the anchoring straps, each having a pointed end for driving into the ground and a top end to which the opposite free end of each anchoring strap attach;
    a heavy duty ground tarp.

8. A method for stabilizing a wind turbine blade when a wind turbine blade is not attached to a wind turbine tower, the method comprising placing the blade on an inflated stabilizer bag that sits on a heavy duty ground tarp and is anchored to the ground, wherein the bag further comprises welds within an interior cavity of said bag and said rings extend out of an aperture while said welds remain in said interior cavity of said bag with a mechanism extending through said ring which allows for said bag to be anchored to the ground and said bag; is deflated and compactly stored after the wind turbine blade is removed.

* * * * *